United States Patent
Cortez et al.

(10) Patent No.: US 10,826,818 B2
(45) Date of Patent: *Nov. 3, 2020

(54) ADVERTISING MESSAGES IN NETWORKS

(71) Applicant: AT&T Intellectual Property II, L.P., Atlanta, GA (US)

(72) Inventors: Bruce Gilbert Cortez, Freehold, NJ (US); Sanja Durinovic-Johri, Aberdeen, NJ (US); Pravin Kumar Johri, Aberdeen, NJ (US); John Paggi, Toms River, NJ (US); Simon S. Zelingher, Morganville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,897

(22) Filed: Feb. 2, 2018

(65) Prior Publication Data

US 2018/0159762 A1 Jun. 7, 2018

Related U.S. Application Data

(63) Continuation of application No. 15/175,149, filed on Jun. 7, 2016, now Pat. No. 9,900,241, which is a
(Continued)

(51) Int. Cl.
*H04L 12/729* (2013.01)
*H04L 12/24* (2006.01)
(Continued)

(52) U.S. Cl.
CPC ........ *H04L 45/125* (2013.01); *H04L 41/0896* (2013.01); *H04L 43/0882* (2013.01);
(Continued)

(58) Field of Classification Search
None
See application file for complete search history.

(56) References Cited

U.S. PATENT DOCUMENTS

| 6,016,306 A | 1/2000 | LeBoudec et al. |
| 6,192,049 B1 * | 2/2001 | Sohraby ............... H04L 49/256 370/389 |

(Continued)

FOREIGN PATENT DOCUMENTS

WO  WO 95/18498  7/1995

OTHER PUBLICATIONS

Chang B-J et al., "Analysis of adaptive cost functions for dynamic update policies for QoS routing in hierarchical networks," Information Sciences, Elsevier, vol. 151, May 2003, pp. 1-26.

*Primary Examiner* — Kibrom T Hailu
(74) *Attorney, Agent, or Firm* — Guntin & Gust, PLC; Douglas Schnabel

(57) ABSTRACT

Switches within a telecommunications network exchange so-called available bandwidth messages, each of which advertises how much bandwidth remains unassigned on a respective link. The network is of a type in which circuits are provisioned with various predefined numbers of time slots (equivalent to bandwidth). The sending of an available bandwidth message for a given link is triggered by a change in the number of time slots available on that link if that change results in a change in the number of circuit bandwidths that can be accommodated by that link for a newly provisioned circuit.

20 Claims, 3 Drawing Sheets

Related U.S. Application Data continuation of application No. 12/653,264, filed on Dec. 10, 2009, now Pat. No. 9,379,961, which is a continuation of application No. 10/786,802, filed on Feb. 25, 2004, now Pat. No. 7,672,331.

(51) Int. Cl.
  *H04L 12/26* (2006.01)
  *H04Q 3/00* (2006.01)
  *H04L 12/701* (2013.01)
  *H04L 12/715* (2013.01)

(52) U.S. Cl.
  CPC .......... *H04L 43/0894* (2013.01); *H04L 43/16* (2013.01); *H04L 45/00* (2013.01); *H04L 45/04* (2013.01); *H04Q 3/0066* (2013.01)

(56) References Cited

U.S. PATENT DOCUMENTS

| | | | | |
|---|---|---|---|---|
| 6,963,927 | B1* | 11/2005 | Lee | H04L 45/00 370/238 |
| 7,016,975 | B2* | 3/2006 | Dolganow | H04L 47/746 709/242 |
| 7,672,331 | B1* | 3/2010 | Cortez | H04L 41/0896 370/395.21 |
| 7,729,253 | B1* | 6/2010 | Khambatkone | H04J 3/1611 370/235 |
| 9,900,241 | B2* | 2/2018 | Cortez | H04L 41/0896 |
| 2002/0083174 | A1* | 6/2002 | Hayashi | H04L 47/11 709/225 |
| 2004/0240470 | A1* | 12/2004 | Medved | H04L 49/15 370/469 |
| 2005/0073955 | A1 | 4/2005 | MacLean et al. | |

\* cited by examiner

ADVERTISING MESSAGES IN NETWORKS

BACKGROUND

The present invention relates generally to the generation of routing messages in telecommunications networks.

Telecommunications networks comprise switches interconnected by communication links. A circuit—which may be customer-requested or may be provisioned by the network operator in order to support, for example, switched traffic operations—is established by setting up a path that comprises a sequence of two or more switches and links connecting them. Routing protocols, such as OSPF (Open Shortest Path First), MPLS (Multi-Protocol Label Switching) and PNNI (Private Network to Network Interface), are utilized by the switches to send routing messages among themselves. These routing messages are used to, for example, disseminate network state information throughout the network. So-called signaling messages are communicated among the switches to allocate the bandwidth on particular links in order to provision the circuits, using the disseminated network state information.

The present invention concerns itself with routing messages transmitted among the switches of the network that advertise how much bandwidth remains unassigned on respective links. A message containing such information is referred to herein as an "available bandwidth message." Upon receipt of a request to provision a new circuit of a certain bandwidth between an originating switch and a terminal switch, the originating switch launches a setup message along a particular path through the network to the destination switch. Bandwidth availability information gleaned from the most recently received available bandwidth messages is used to select a path having sufficient unassigned bandwidth on all of its links to accommodate the requested circuit. As each switch receives the setup message, it allocates the requested amount of bandwidth to the circuit on a link extending to the next switch along the path. A design trade-off is involved in the generation and transmission of available bandwidth messages. It is desirable that they be sent relatively frequently. The greater the time interval between the transmission of available bandwidth messages, the more likely it is that there will be insufficient bandwidth on one or more links identified for a circuit being set up because some or all of the advertised bandwidth may have been allocated to other circuit(s) in the interim. In this case the circuit must be "cranked back" to the originating switch from the point where the attempted allocation has failed, meaning that a crankback message is sent back along the path in question, causing the bandwidth allocated to the circuit to be de-allocated, link-by-link, all the way back to the originating switch. The latter must then identify a different path through the network that (hopefully) does have enough bandwidth on each of its links to accommodate the request, and the process begins again.

As will be appreciated, the necessity of cranking back large numbers of circuits is undesirable in that it represents a waste of network resources and delays fulfillment of the customer's circuit request. The number of crankbanks resulting from attempted circuit setups using outdated available-bandwidth information can be reduced by sending available bandwidth messages more frequently. Indeed, it might be thought that the ideal situation would be to transmit an available bandwidth message for a link whenever the available bandwidth on that link changes. That approach, however, engenders its own problems in that it increases the amount of routing traffic in the network, thereby requiring that the network be designed with enough resources to accommodate the increased traffic level, including the resources needed to formulate the messages, transmit them, and assimilate the information that they contain.

Even if the network has sufficient resources to handle normal circuit setup operations, it could become unduly congested when a large number of circuits need to be set up over a short period of time, such as during a restoration of service after a cable cut or other catastrophic network event has occurred, thereby impairing the network's ability to communicate all kinds of signaling messages needed to carry out the restoration process and thereby impairing the network's ability to rapidly reroute its circuits when such events occur.

The magnitude of the aforementioned problem can be more fully appreciated by considering the way in which available bandwidth messages are transmitted in a system that uses, for example, the above-mentioned PNNI routing protocol. The switches in the network can exist at various levels of the PNNI routing hierarchy. A node in the hierarchy can be a single switch or can be a number of switches assigned to a peer group, wherein each node in the peer group exchanges information with other nodes in the peer group so that all nodes maintain an identical view of the peer group. A so-called peer group leader communicates summary information relating to its own peer group, including the state of its links, to switches outside of the peer group, including to other peer group leaders.

The nodes within a peer group communicate routing information to one another using a type of message referred to as a PNNI Topology State Element, or PTSE. One particular type of PTSE transmitted by a switch is called a link PTSE, which contains information about a particular link. This information includes the amount of bandwidth available on the link. The link PTSE thus functions as the available bandwidth message within the PNNI protocol.

Nodes within a peer group communicate link PTSEs among themselves using a process referred to as "flooding." Flooding is the reliable hop-by-hop propagation of link PTSEs throughout a peer group to ensure that every node gets every link PTSE. Every node must send its own (self-originated) link PTSEs out on all its interfaces or links from the node. Every node, upon receiving a link PTSE from another node, is expected to send a copy out on all its interfaces or links except, perhaps, the one that goes back to the node from which the link PTSE was received. Some of the switches could have more than fifty links to other neighboring switches (some of which may be in other peer groups), although there may be several parallel links to the same neighbor. Many switches are smart enough to recognize that if there are multiple links to the same neighbor, then they flood available bandwidth messages on only one of these links. Still, the number of neighbors could be large, often greater than fifteen. This means that a switch with an adjacency (number of neighbors) of say, sixteen, could see as many as fifteen duplicates of each link PTSE due to the way flooding works. A duplicate message is discarded but only after a fair amount of processing is done on it. This includes time to process all lower layer encapsulations, as well as the link PTSE message header, and a routing database lookup. This can result in a lot of wasted CPU cycles and can create a high load on the CPU of the switch, often at times (like a large restoration event) when the CPU can least afford wasted cycles. The duplicate messages can also clog queues and result in message discards if the queues fill up.

During a large failure/restoration event, hundreds of links can be affected and the available bandwidth on a link can change rapidly as the failed connections release previously allocated bandwidth and then as restoring connections reassigns available bandwidth. This can result in hundreds, and sometimes thousands, of link PTSEs being flooded to a node in a very short time.

The above problems are ameliorated in the prior art to some extent by imposing certain constraints on how often and under what constraints an available bandwidth message is sent. In particular, prior art arrangements send an available bandwidth message for a link only when the amount of bandwidth available on that link changes (increases or decreases) by a predetermined percentage amount and/or by a predetermined absolute amount. Indeed, by adjusting how great that change needs to be before a message is sent out, the network is able to achieve a workable balance between the timeliness of the bandwidth-availability data and the number of available bandwidth messages launched into the system per unit time. Moreover, the prior art imposes certain time restrictions on the sending of the available bandwidth messages, e.g., the sending by a node or switch of no more than one link PTSE per second for a given link, no matter how many times the available bandwidth of that link changes during that time period.

SUMMARY OF THE INVENTION

The present invention provides a way of yet further reducing the number of available bandwidth messages, such as link PTSEs, that are launched into the network per unit time without causing any significant increase in crankbanks.

The invention takes advantage of the fact that, in many systems, circuits are provisioned in discrete bandwidth amounts. We have thus realized that the fact that the available bandwidth on a link has changed is not a useful piece of information in such systems unless the number of different circuit bandwidths that are available for newly provisioned circuits has changed. That is, the amount of available bandwidth change for the link is such as to either a) allow for the next level of circuit bandwidth to be accommodated or b) make a previously available circuit bandwidth no longer available. Implementationally, this mode of operation can be achieved by sending an available bandwidth message only when the available bandwidth has either a) increased from its previous value to a value at least equal to the next higher circuit bandwidth or b) has decreased from its previous value to a value that is lower than the next lower circuit bandwidth.

For example, the circuits in optical transport networks are typically STS-N (Synchronous Transport Signal level N) circuits having N time slots, where, in current or planned future systems, N is 1, 3, 12, 24, 48 or 192 (the number of time slots used by a circuit being a measure of its bandwidth). These circuits are referred to as STS-1, STS-3, STS-12, STS-24, STS-48 and STS-192 circuits. In order to route an STS-N circuit over a particular link, it is enough to know whether N slots are available on the link or not. For example, it is of no importance that the available bandwidth on a link has changed from 15 slots to 21 slots, because prior to the change that link could have accommodated a new STS-1, STS-3 or STS-12 circuit and after the change, that link can still only accommodate those same three circuit bandwidths. Rather, what is important to know is whether the available bandwidth on this link has either a) increased to at least 24, because a new STS-24 circuit could now be accommodated in addition to the three STS-1, STS-3 or STS-12 circuit bandwidths, or b) has decreased to less than 12, because now an STS-12 circuit can no longer be accommodated, leaving only the STS-1 and STS-3 circuit bandwidths. Thus the criterion to be used in determining whether a change in available bandwidth should be advertised is whether the new available number of time slots either a) increased from its previous value to a value at least equal to the next higher one of the time slot amounts 1, 3, 12, 24, 48 or 192, or b) has decreased from its previous value to a value that is lower than the next lower one of those time slot amounts.

It is also possible to define the invention as causing an available bandwidth message to be sent if the amount of available bandwidth has crossed any one of a plurality of thresholds.

Particular embodiments of the invention may also incorporate various aspects of prior art practice, such as the limitation that a switch will transmit no more than one available bandwidth message relative to a given link within a given time period, such as one second.

Another advantage of the invention is that the reduction in the number of available bandwidth messages that are generated—particularly during restoration—will allow the scaling of the network to a larger size without requiring a concomitant increase in the amount of resources needed for the transmission of available bandwidth messages.

DETAILED DESCRIPTION

Figure 1:
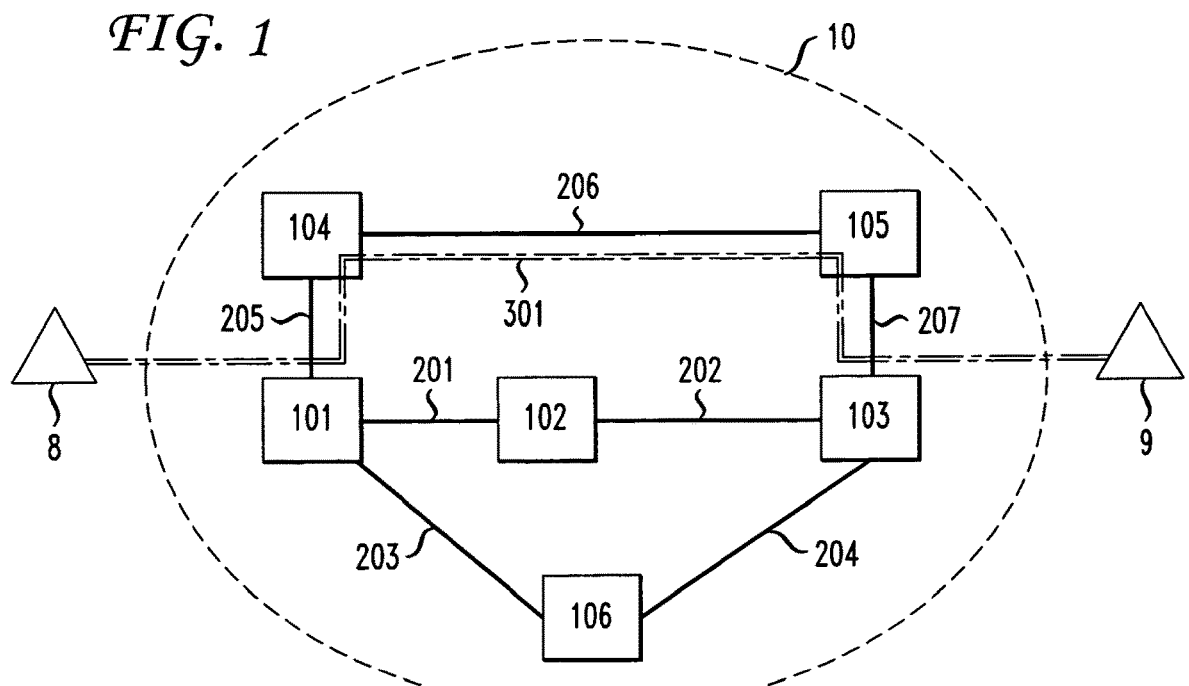
FIG. 1 is an illustrative network in which the present invention is implemented.

FIG. 1 shows an illustrative network 10 in which the present invention is implemented. Network 10 includes a plurality of switches 101-106 and a plurality of point-to-point communication links 201-207. Links 201-207 can be OCN optical links such as OC-48, OC-12, OC-3 and/or DS-3 communication links. Although not shown, there can be multiple links between a pair of switches. Each link 201-207 is typically bi-directional and has potentially different characteristics in each direction. For example, the various links could have respective different bandwidths and administrative weight in each direction. It is assumed in this example that all the links have the same characteristics in both directions. As is well-known, multiple links can also be grouped into an "aggregated link."

Switches 101-106 may be, for example, optical switches, ATM (Asynchronous Transfer Mode) switches, FR (Frame Relay) switches or IP/MPLS routers. The switches can automatically discover the network and set up circuits using known link-state routing and signaling protocols.

Circuits established between a pair of switches can include one or more intermediate switches. The service route of the circuit is the set of links and switches on which it is set up. FIG. 1 illustrates a particular circuit 301 that has been set up through network 10 to interconnect end systems 8 and 9. As can be seen, circuit 301 includes switches 101, 104, 105 and 103 and links 205, 206 and 207, as well as the access network connections between end systems 8 and 9 and switches 101 and 103, respectively.

Figure 2:
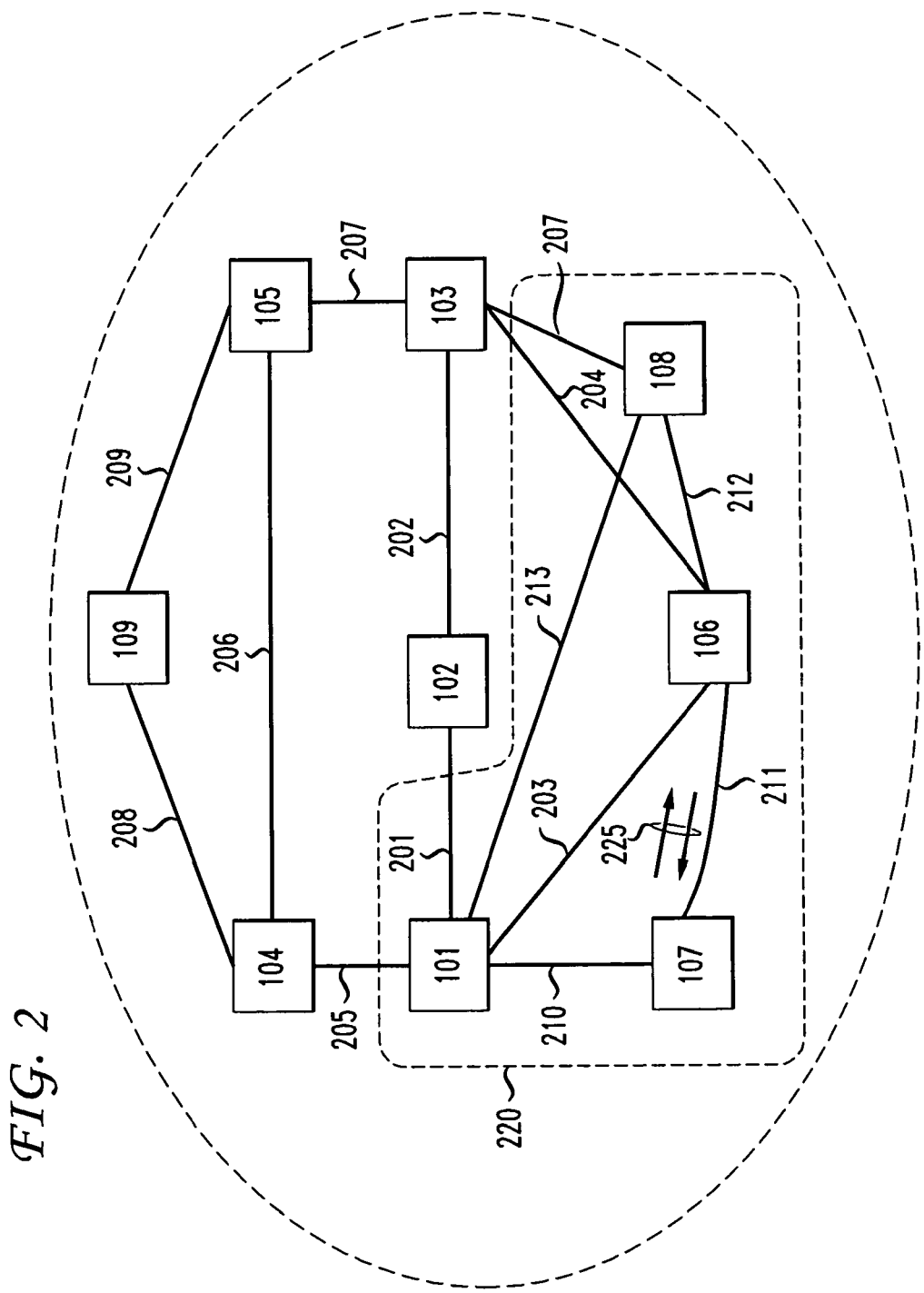
FIG. 2 shows a different view of the network of FIG. 1, helpful in illustrating certain aspects of the PNNI routing protocol.

It is assumed in the present illustrative embodiment that routing messages—which provide information about network topology, including available bandwidth on the various links—are communicated among the various switches using the PNNI protocol. FIG. 2 shows another view of network 10 helpful in explaining certain aspects of the PNNI protocol. In particular, nodes in the PNNI hierarchy comprise individual switches and/or groups of switches, the latter being referred to as peer groups. FIG. 2 depicts each one of switches 101 through 106 as a node and shows that network 10 further includes switches 107 through 109 that are not shown in FIG. 1. Network 10 may, of course, include any desired number of switches. FIG. 2 also shows links 201 through 207, as well as links 208 through 213 not shown in FIG. 1.

Switches 101, 106, 107 and 108 constitute a peer group for PNNI purposes, denoted as peer group 220. As previously noted, link PTSEs are messages transmitted among the switches within a peer group. In addition to being in the same peer group as switch 101, switches 106, 107 and 108 are all neighbors of switch 101 since each is connected to switch 101 by a link. Switches 107 and 108, although in the same peer group, are not neighbors since there is no link connecting them. Switches also have neighbors that are not in the same peer group. For example, switch 104 is a neighbor of switch 101. Although only one peer group is indicated in the FIG., a typical network will include many peer groups. The concept of "neighbor" is important in that even though a switch (other than the peer group leader) may only send and receive routing messages with the members of its peer group, a switch sends and receives signaling messages with its neighbors during, for example, call setup, even if a neighbor does not belong to its peer group.

Signaling, routing and other messages are communicated among the various switches over channels carried by the same links, i.e., links 201 through 213, that carry the customer traffic. For example, a dedicated channel could be set aside on each link for this purpose or inband signaling could be used or a channel within the SONET overhead could be used. Although not envisioned for the present embodiment, the switches could, alternatively, communicate signaling and routing messages over a totally separate network similar to the conventional type of SS7 network, or they might communicate over a separate IP network.

Arrows 225 in FIG. 2 represent respective signaling or routing messages—which could be, for example, link PTSEs—sent by switch 106 to switch 107 and vice versa.

Network 10 allocates circuits in discrete bandwidth amounts. More particularly, network 10 is illustratively an optical transport network in which the provisioned circuits are STS-N circuits, such as STS-1, STS-3, STS-12, STS-24, STS-48 and STS-192 circuits, which require 1, 3, 12, 24, 48 and 192 time slots (equivalent to bandwidth), respectively. In order to route an STS-N circuit over a particular link, it is enough to know whether N slots are available on the link or not. Thus, in accordance with the present invention, we have recognized that a change in available bandwidth is sufficient to cause a new available bandwidth message, i.e., link PTSE, to be transmitted only if that change in bandwidth changes the number of circuit bandwidths that are available on that link for a newly provisioned circuit. For example, as noted earlier, a link having 15 available time slots can accommodate three circuit bandwidths for a newly provisioned circuit—an STS-1, an STS-3 or an STS-12 circuit—and after the change, it can still only accommodate those three circuit bandwidths. Thus the fact that the available bandwidth has changed from, say, 15 time slots to 21 time slots is not helpful information and such a change will not trigger the sending of a new link PTSE. On the other hand, a change from 15 time slots to 24 time slots is important to know because four circuit bandwidths can now be accommodated—STS-1, STS-3, STS-12 and STS-24. Similarly a change from 15 time slots to 10 time slots is important to know because only two circuit bandwidths can now be accommodated—STS-1 and STS-3. Implementationally, the criterion to be used in determining whether a change in available bandwidth should be advertised is whether the new available number of time slots has become either a) at least as great as or b) less than (in this example) the set of thresholds 1, 3, 12, 24, 48 or 192.

It is also possible to define the invention as causing an available bandwidth message to be sent if the amount of available bandwidth has crossed any one of a plurality of thresholds. With such a definition, we must take account of the fact that an upward change in the amount of available bandwidth is important if the new amount at least equals the next higher bandwidth (or time slot) amount. By contrast, a downward change in the amount of available bandwidth is important if the new amount crosses below the next lower bandwidth (or time slot) amount. However, as long as we understand the aforementioned thresholds to each be slightly less than one of the discrete circuit bandwidth amounts, it is indeed possible to define the invention in the way just suggested. For example, if the aforementioned set of thresholds is taken to be 0.5, 2.5, 11.5, 23.5, 47.5 and 191.5 (that is, 0.5 less than the standard time slot values 1, 3, 12, 24, 48 and 192), then it can be said that the invention causes an available bandwidth message to be sent whenever the amount of available bandwidth crosses any one of those thresholds in either the up or down direction. It can thus be said, in general, that the aforementioned thresholds are each a function of one of the discrete bandwidth amounts.

It should be noted in this regard that although the invention can actually be implemented by doing threshold comparisons of this type, other ways of implementing the invention are possible. Such other ways of implementing the invention may nonetheless be seen as inherently meeting this threshold-based definition of the invention. That is, if the available bandwidth of a link changes from 3 time slots to 12 time slots and an available bandwidth message is transmitted as a result of that change, one can say that the available bandwidth message was transmitted in response to the available bandwidth having crossed a threshold, e.g., 11.5, even if the determination that that change from 3 to 12 occurred did not involve comparing 3 and/or 12 with 11.5. That is, the value 11.5 was, indeed, crossed when the change happened.

Figure 3:
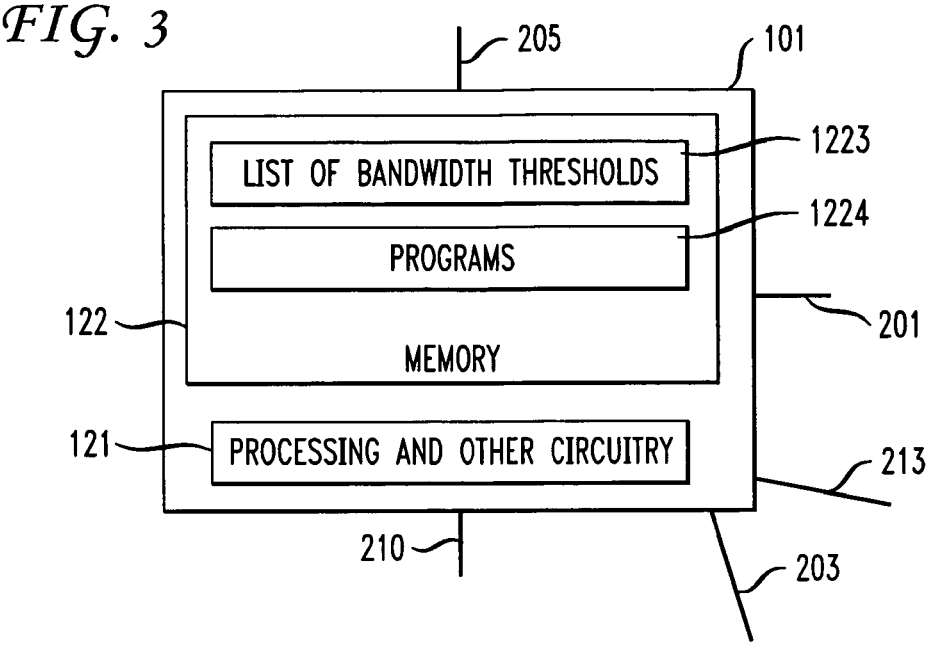
FIG. 3 is a block diagram of one of the switches in the network of FIG. 1.

FIG. 3 is a generalized block diagram of switch 101, taken as exemplary. Switch 101 can be characterized as having two basic types of components—processing and other circuitry 121 and memory 122. Within memory 122 is a table 1223 containing a list of the aforementioned bandwidth thresholds. Memory 122 also contains programs 1224 that are executed by circuitry 121 to carry out the various functions and functionalities of the switch, including the transmission of available bandwidth messages, illustratively link PTSEs, pursuant to the principles of the invention.

Figure 4:
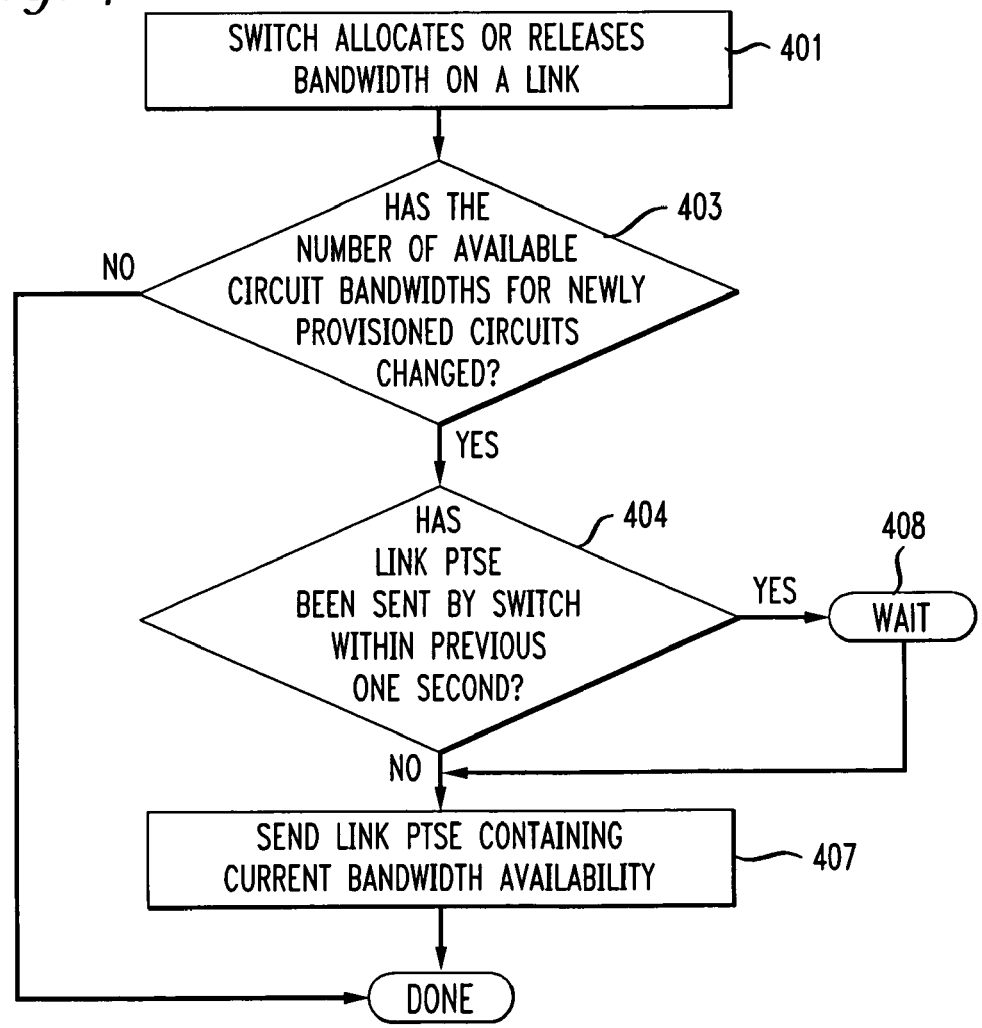
FIG. 4 is a flowchart of the basic functions carried out by a switch of FIG. 3 in implementing the principles of the invention—specifically for determining when a available bandwidth message should be transmitted.

FIG. 4 is flowchart of the basic functions carried out by switch 101 in implementing the decision as to when a link PTSE should be sent, pursuant to the principles of the present invention—specifically for determining when an available bandwidth message should be transmitted.

The process begins at 401 in response to the switch having allocated or released bandwidth on one of its associated links. It is then determined at 403 whether the number of available circuit bandwidths has changed. This is equivalent in this embodiment to determining whether the number of time slots available on the link has either a) increased from its previous value to a value at least equal to the next higher circuit bandwidth, or threshold, as defined in table 1223 or b) has decreased from its previous value to a value that is lower than the next lower circuit bandwidth. Referring again to the above example, if the available bandwidth prior to the change was 15 time slots, step 403 determines whether the number of times slots now available on the link is at least equal to 24 or is lower than 12.

If the answer at 403 is "yes," it is then determined at 404 whether the switch has sent out a link PTSE for this link within the previous one second because, as noted above, it is desirable to impose a minimum time period between the sending of successive PTSEs. A check is therefore made at 404. If a link PTSE indicating the new available bandwidth was not sent within the previous one second, then a link PTSE is sent at 407. Otherwise, the process waits at 408 until that one second has expired and then the link PTSE is sent at 407. If the amount of available bandwidth for this link changes during the wait, then the link PTSE that is ultimately sent indicates the latest value.

Although not shown in the FIG., a switch will send a link PTSE for each link periodically, e.g., once every half hour, whether or not the available bandwidth on that link has changed by any particular amount, if any. This helps ensure that the network is operating with correct routing data.

The foregoing merely illustrates the principles of the invention.

For example, the present invention has been described with each switch having a list of thresholds that it applies to all its links. The invention also applies to different switches having different lists of thresholds, as well as to a switch having multiple lists of thresholds and applying different lists to different links.

The present invention is applicable to other MPLS-based IP (Internet Protocol) networks and the traditional ATM and Frame Relay (FR) networks as well. The present invention can also be used with any telecommunications network with switches capable of establishing circuits—for example, Frame Relay switches, ATM switches, IP/MPLS routers, optical switches, digital and optical cross-connects, to name a few.

It should be understood that the present invention can be employed in routing protocols in general. Furthermore, the present invention can be employed in systems using routing protocols that are compliant with various routing standards and their variants, including but not limited to the OSPF routing protocol.

It will thus be appreciated that although the principles of the present invention have been illustrated in conjunction with a specific embodiment, those skilled in the art will be able to devise many alternatives, modifications and variations that embody those principles and thus are within their spirit and scope.

The invention claimed is:

1. A method, comprising:
    determining, by a switch, an available bandwidth associated with a first communications link, the first communications link associated with a routing hierarchy in a communications network;
    comparing, by the switch, the available bandwidth to a bandwidth associated with an additional circuit added by a second communications link hierarchically higher in the routing hierarchy than the first communications link;
    determining, by the switch, that the available bandwidth exceeds the bandwidth associated with the additional circuit added by the second communications link hierarchically higher in the routing hierarchy than the first communications link;
    in response to the determining that the available bandwidth exceeds the bandwidth associated with the additional circuit, sending, by the switch, a message via the communications network, the message advertising the available bandwidth;
    periodically generating, by the switch, a periodic update to the available bandwidth associated with the first communications link; and
    periodically sending, by the switch, additional messages via the communications network, each one of the additional messages specifying the periodic update to the available bandwidth associated with the first communications link.

2. The method of claim 1, further comprising comparing the available bandwidth to a threshold value.

3. The method of claim 1, further comprising associating the switch to the routing hierarchy.

4. The method of claim 1, further comprising determining a direction associated with the available bandwidth.

5. The method of claim 1, further comprising determining that the available bandwidth fails to exceed the bandwidth associated with the additional circuit.

6. The method of claim 1, further comprising determining the available bandwidth as a number of discrete time slots.

7. The method of claim 1, further comprising allocating the available bandwidth to the first communications link.

8. The method of claim 1, further comprising sending the message via the communications network.

9. A system, comprising:
    a hardware processor; and
    a memory device storing code that, when executed by the hardware processor, perform operations, the operations comprising:
    determining an available bandwidth associated with a first communications link associated with a routing hierarchy in a communications network;
    comparing the available bandwidth to a bandwidth associated with an additional circuit added by a second communications link that is hierarchically higher in the routing hierarchy than the first communications link, wherein the second communications link is associated with the routing hierarchy in the communications network;
    determining that the available bandwidth exceeds the bandwidth associated with the additional circuit added by the second communications link;
    sending a message via the communications network, the message advertising the additional circuit added by the second communications link;
    generating periodic updates to the available bandwidth associated with the first communications link; and
    periodically sending additional messages via the communications network, each one of the additional messages specifying a corresponding one of the periodic updates to the available bandwidth associated with the first communications link.

10. The system of claim 9, wherein the operations further comprise comparing the available bandwidth to a threshold value.

11. The system of claim 9, wherein the operations further comprise associating the first communications link to the routing hierarchy.

12. The system of claim 9, wherein the operations further comprise associating the first communications link to the routing hierarchy.

13. The system of claim 9, wherein the operations further comprise determining a direction associated with the available bandwidth.

14. The system of claim 9, wherein the operations further comprise determining the available bandwidth as a number of discrete time slots.

15. The system of claim 9, wherein the operations further comprise determining the available bandwidth fails to exceed the bandwidth associated with the additional circuit.

16. The system of claim 9, wherein the operations further comprise allocating the available bandwidth.

17. A memory device storing instructions that when executed by a processor perform operations, the operations comprising:
   determining an available bandwidth associated with a first communications link connected in a routing hierarchy between switches of a communications network;
   comparing the available bandwidth to a bandwidth associated with an additional circuit added by a second communications link that is hierarchically higher in the routing hierarchy than the first communications link, wherein the second communications link is connected in the routing hierarchy between the switches of the communications network;
   determining that the available bandwidth exceeds the bandwidth associated with the additional circuit added by the second communications link;
   sending a message via the first communications link, the message advertising the available bandwidth;
   generating periodic updates to the available bandwidth associated with the first communications link; and
   periodically sending additional messages via the first communications link, each one of the additional messages specifying a corresponding one of the periodic updates to the available bandwidth.

18. The memory device of claim 17, wherein the operations further comprise comparing the available bandwidth to a threshold value.

19. The memory device of claim 17, wherein the operations further comprise determining a direction associated with the available bandwidth.

20. The memory device of claim 17, wherein the operations further comprise allocating the available bandwidth.

* * * * *